US007726693B2

(12) United States Patent
Koide

(10) Patent No.: US 7,726,693 B2
(45) Date of Patent: Jun. 1, 2010

(54) MOTOR RETRACTOR AND DRIVE CONTROL THEREOF

(75) Inventor: Teruhiko Koide, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 484 days.

(21) Appl. No.: 11/504,614

(22) Filed: Aug. 16, 2006

(65) Prior Publication Data
US 2007/0040058 A1 Feb. 22, 2007

(51) Int. Cl.
*B60R 22/34* (2006.01)
*B60R 22/48* (2006.01)

(52) U.S. Cl. .................. 280/807; 180/268; 242/374; 242/390.8; 280/801.1; 297/474

(58) Field of Classification Search ............... 180/268, 180/281, 286; 242/374, 390.1, 390.8, 390.9; 280/801.1, 806, 807; 297/474–481; 701/45
See application file for complete search history.

(56) References Cited

U.S. PATENT DOCUMENTS

| | | | | |
|---|---|---|---|---|
| 3,986,093 | A * | 10/1976 | Wakamatsu et al. ......... | 318/484 |
| 4,478,433 | A * | 10/1984 | Taguchi et al. .............. | 280/807 |
| 4,511,097 | A * | 4/1985 | Tsuge et al. ............. | 242/390.9 |
| 4,572,543 | A * | 2/1986 | Tsuge et al. ................ | 280/807 |
| 4,655,312 | A * | 4/1987 | Frantom et al. ............. | 180/268 |
| 4,666,097 | A * | 5/1987 | Tsuge et al. ............. | 242/390.1 |
| 4,669,680 | A * | 6/1987 | Nishimura et al. ....... | 242/375.3 |
| 6,332,629 | B1 * | 12/2001 | Midorikawa et al. ........ | 280/806 |
| 6,427,935 | B1 * | 8/2002 | Fujii et al. ............... | 242/390.9 |
| 6,485,057 | B1 | 11/2002 | Midorikawa et al. | |
| 6,737,819 | B2 * | 5/2004 | Tanji .............................. | 318/3 |
| 7,251,111 | B2 * | 7/2007 | Tanaka et al. .......... | 318/400.01 |

(Continued)

FOREIGN PATENT DOCUMENTS

JP 61-146459 U 9/1986

(Continued)

OTHER PUBLICATIONS

Notice of Reasons for Rejection issued by Japanese Patent Office in corresponding Japanese Patent Application No. 2005-240053 mailed Mar. 16, 2010.

*Primary Examiner*—Faye M. Fleming
*Assistant Examiner*—Laura Freedman
(74) *Attorney, Agent, or Firm*—Roberts Mlotkowski Safran & Cole, P.C.; Thomas W. Cole

(57) ABSTRACT

When the worn state of the webbing is lifted, current of a current value I0 corresponding to the appropriate storing speed of the webbing is supplied to the motor, whereby a take-up shaft rotates and the webbing is taken up. At a point in time when the webbing has been taken up to the extent that the webbing does not hinder the exiting of a vehicle by a passenger, the size of the supply current to the motor is reduced from the initial current value I1 to a current value I1. A reference current value IL of a stall current for determining whether to stop the motor when a foreign object or the like has become entangled between the webbing and an in-vehicle part can also be set to be small in correspondence to the reduced current value I1.

18 Claims, 3 Drawing Sheets

U.S. PATENT DOCUMENTS

| | | | |
|---|---|---|---|
| 7,416,149 B2 * | 8/2008 | Koide et al. | 242/374 |
| 7,517,025 B2 * | 4/2009 | Tanaka et al. | 297/477 |
| 2002/0189880 A1 * | 12/2002 | Tanaka et al. | 180/268 |
| 2004/0075008 A1 * | 4/2004 | Mori et al. | 242/390.8 |
| 2005/0224621 A1 * | 10/2005 | Mori | 242/374 |

FOREIGN PATENT DOCUMENTS

| | | |
|---|---|---|
| JP | 2004-244011 | 9/2004 |
| JP | 2005-119403 A | 5/2005 |
| JP | 2006-103475 A | 4/2006 |

* cited by examiner

MOTOR RETRACTOR AND DRIVE CONTROL THEREOF

CROSS-REFERENCE TO RELATED APPLICATION

This application claims priority under 35 USC 119 from Japanese Patent Application No. 2005-240053, the disclosure of which is incorporated by reference herein.

BACKGROUND OF THE INVENTION

1. Field of the Invention

The present invention relates to a webbing take-up device, and in particular to a motor retractor that can take up a webbing by a motor causing a take-up shaft to rotate.

2. Description of the Related Art

Seat belt devices that restrain passengers seated in seats with a long band-like webbing are attached to vehicles such as passenger cars, and a retractor (webbing take-up device) that stores the webbing in a state where the webbing is taken up such that it can be pulled out is disposed in so-called 3-point seat belt devices.

The retractor is disposed with a take-up shaft, to which the longitudinal-direction base end side of the webbing is fastened and which takes up the webbing from its base end side by rotating, and a biasing member such as a spiral spring, which biases the take-up shaft in the take-up direction of the webbing. Additionally, in a seat belt device disposed with this retractor, the take-up shaft is biased in the take-up direction of the webbing by the biasing force of the biasing member when a passenger wears the webbing, whereby the webbing from which slack has been removed restrains the passenger. Further, the webbing is taken up on the take-up shaft by the biasing force of the biasing member when the passenger lifts the worn state of the webbing.

Here, when the biasing force of the biasing member is small, the webbing is not able to be completely taken up and becomes slack, which causes the worsened appearance of the webbing when the webbing is not in use. On the other hand, when the biasing force of the biasing member is large, this imparts a feeling of tightness to the passenger wearing the webbing.

For this reason, a motor retractor is being considered which is disposed with a mechanism (so-called "storage assist mechanism") that drives the take-up shaft by the drive force of a motor in order to reduce the biasing force of the biasing member and alleviate (control) the feeling of tightness imparted to the passenger and to assist the lowering of the webbing take-up force on the take-up shaft resulting from this reduction of the biasing force (e.g., see Japanese Patent Application Publication No. 2004-244011).

A motor retractor disposed with such a storage assist mechanism is usually disposed with a control circuit that controls the supply current to the motor. The control circuit is configured to supply current to the motor when it is detected that the worn state of the webbing has been lifted and to cut off the supply of current to the motor when it is detected that the webbing is completely stored and stall current is flowing to the motor, for example.

Incidentally, in a motor retractor of this configuration, it is necessary to stop the motor when a foreign object becomes entangled in the webbing while the webbing is being taken up. In this case, for example, it is conceivable to detect the stall current occurring in the motor by the entanglement of the foreign object and stop the motor. It is preferable for the motor retractor to be configured such that the motor is stopped by the detection of the stall current in this manner, because the supply current can be controlled by an existing control circuit.

However, because the current value of the current supplied to the motor is set to be somewhat large on the basis of an appropriate storing speed of the webbing, the current value of the detectable stall current also ends up becoming inevitably large. When the current value of the detectable stall current is large in this manner, the motor cannot be stopped in a low torque state when a foreign object has become entangled in the webbing, and for this reason, a measure to solve this has been sought after.

SUMMARY OF THE INVENTION

The present invention has been made in view of the above circumstances, and it is an object thereof to obtain a motor retractor that can ensure an appropriate storing speed of a webbing and can stop a motor in a low torque state in abnormal times.

A first aspect of the invention provides a motor retractor comprising: a long band-like webbing that restrains the body of a passenger seated in a seat of a vehicle in a state where the passenger is wearing the webbing; a take-up shaft to which a longitudinal-direction base end side of the webbing is locked and which is rotated such that the webbing can be taken up and pulled out; a motor that causes the take-up shaft to rotate in the webbing take-up direction; and a controller that supplies current of a predetermined current value $I0$ to the motor when the worn state of the webbing has been lifted and reduces the size of the supply current to a current value $I1$ that is smaller than the current value $I0$ at a point in time when a preset amount of the webbing has been taken up or at a point in time when a predetermined amount of time has elapsed after the wearing of the webbing has been lifted.

The "stall current" in the present invention refers to current that flows to the motor when the rotation of the output shaft is controlled in a state where current is supplied to the motor and the output shaft is rotating.

In the motor retractor of the above aspect, when the passenger seated in the seat of the vehicle pulls the webbing stored in the motor retractor, the take-up shaft rotates and the webbing is pulled out. Thus, the passenger can wear the webbing on his/her body by placing the pulled-out webbing around his/her body and causing a tongue plate disposed on the webbing to engage with a buckle device, for example.

Here, in the motor retractor of the above aspect, the controller supplies current of a predetermined current value $I0$ to the motor when the worn state of the webbing has been lifted and reduces the size of the supply current to a current value $I1$ that is smaller than the current value $I0$ at a point in time when a preset amount of the webbing has been taken up or at a point in time when a predetermined amount of time has elapsed after the wearing of the webbing has been lifted.

That is, when the passenger lifts the worn state of the webbing (e.g., when the passenger disengages the tongue plate from the buckle device), current of the current value $I0$ is supplied to the motor, whereby the webbing is taken up on the take-up shaft. For example, by setting the current value $I0$ at this time in correspondence to an appropriate storing speed of the webbing, the webbing can be suitably taken up in the period of time at the start of the taking-up of the webbing (in a state where the webbing has been sufficiently pulled out from the take-up shaft). Further, in this state, because the webbing is being sufficiently pulled out from the take-up shaft, foreign objects do not become entangled between the webbing and an in-vehicle part such as a seat, and there is sufficient leeway to remove foreign objects.

When the preset amount of the webbing has been taken up or when the predetermined amount of time has elapsed after the electrical feed to the motor is started (e.g., when the webbing is taken up to an extent that the webbing does not hinder the exiting of the vehicle by the passenger), the controller reduces the size of the supply current to the motor to the current value $I1$ that is smaller than the initial current value $I0$. For this reason, the take-up speed of the webbing becomes slower, but this does not become a problem because the webbing is taken up to the extent that it does not hinder the exiting of the vehicle by the passenger.

Further, in this manner, because the size of the supply current to the motor is reduced from the initial current value $I0$ to the current value $I1$ at the point in time when the webbing has been taken up to the extent that it does not hinder the exiting of the vehicle by the passenger, the current value of the stall current for stopping the motor can also be set small in correspondence to the current value $I1$, for example. Thus, even in abnormal times such as when a foreign object becomes entangled between the webbing and an in-vehicle part, it becomes possible to stop the motor in a low torque state.

In this manner, in the motor retractor of the above aspect, an appropriate storing speed of the webbing can be ensured, and the motor can be stopped in a low torque state in abnormal times.

A second aspect of the invention provides a motor retractor comprising: a long band-like webbing that restrains the body of a passenger seated in a seat of a vehicle in a state where the passenger is wearing the webbing; a take-up shaft to which a longitudinal-direction base end side of the webbing is locked and which is rotated such that the webbing can be taken up and pulled out; a motor that causes the take-up shaft to rotate in the webbing take-up direction; and a controller that supplies current of a predetermined current value $I0$ to the motor when the worn state of the webbing has been lifted, reduces the size of the supply current to a current value $I1$ that is smaller than the current value $I0$ at a point in time when a preset amount of the webbing has been taken up or at a point in time when a predetermined amount of time has elapsed, and thereafter cuts off the supply of the current to the motor when a stall current equal to or greater than a current value $IL$ that is larger than the current value $I1$ flows to the motor.

The "stall current" in the second aspect refers to current that flows to the motor when the rotation of the output shaft is controlled in a state where current is supplied to the motor and the output shaft is rotating.

In the motor retractor of the above aspect, when the passenger seated in the seat of the vehicle pulls the webbing stored in the motor retractor, the take-up shaft rotates and the webbing is pulled out. Thus, the passenger can wear the webbing on his/her body by placing the pulled-out webbing around his/her body and causing a tongue plate disposed on the webbing to engage with a buckle device, for example.

Here, in the motor retractor of the above aspect, the controller supplies current of a predetermined current value $I0$ to the motor when the worn state of the webbing has been lifted, reduces the size of the supply current to a current value $I1$ that is smaller than the current value $I0$ at a point in time when a preset amount of the webbing has been taken up or at a point in time when a predetermined amount of time has elapsed, and thereafter cuts off the supply of the current to the motor when a stall current equal to or greater than a current value $IL$ that is larger than the current value $I1$ flows to the motor.

That is, when the passenger lifts the worn state of the webbing (e.g., when the passenger disengages the tongue plate from the buckle device), the controller supplies current of the current value $I0$ to the motor, whereby the motor is driven and the webbing is taken up on the take-up shaft. For example, by setting the current value $I0$ at this time in correspondence to an appropriate storing speed of the webbing, the webbing can be suitably taken up in the period of time at the start of the taking-up of the webbing (in a state where the webbing has been sufficiently pulled out from the take-up shaft). Further, in this state, because the webbing is being sufficiently pulled out from the take-up shaft, foreign objects do not become entangled between the webbing and an in-vehicle part such as a seat, and there is sufficient leeway to remove foreign objects.

When the preset amount of the webbing has been taken up or when the predetermined amount of time has elapsed after the electrical feed to the motor is started (e.g., when the webbing is taken up to an extent that the webbing does not hinder the exiting of the vehicle by the passenger), the controller reduces the size of the supply current to the motor to the current value $I1$ that is smaller than the initial current value $I0$. For this reason, the take-up speed of the webbing becomes slower, but this does not become a problem because the webbing is taken up to the extent that it does not hinder the exiting of the vehicle by the passenger. Further, even if a foreign object becomes entangled between the webbing and an in-vehicle part thereafter, the stall current equal to or greater than the current value $IL$ that is larger than the current value $I1$ of the current being supplied to the motor flows to the motor. Thus, the controller cuts off the supply of current to the motor, and the motor stops.

In this manner, because the controller reduces the size of the supply current to the motor from the initial current value $I0$ to the current value $I1$ at the point in time when the webbing has been taken up to the extent that it does not hinder the exiting of the vehicle by the passenger, the current value $IL$ of the stall current for stopping the motor can also be set small in correspondence to the current value $I1$, for example. Thus, even in abnormal times such as when a foreign object becomes entangled between the webbing and an in-vehicle part, it becomes possible to stop the motor in a low torque state.

It will be noted that when a foreign object has not become entangled between the webbing and an in-vehicle part, the stall current flows to the motor as a result of the webbing being completely stored in the motor retractor, whereby the controller cuts off the supply of current to the motor, and the motor stops.

In this manner, in the motor retractor of the second aspect, an appropriate storing speed of the webbing can be ensured, and the motor can be stopped in a low torque state in abnormal times.

The motor retractor of the first or second aspect may further comprise a biasing member that is coupled to the take-up shaft and biases the take-up shaft in the webbing take-up direction with a biasing force that does not cause the passenger wearing the webbing to experience a sense of tightness.

In the motor retractor of the above configuration, the take-up shaft is biased in the webbing take-up direction by the biasing member in a state where the passenger is wearing the webbing. Thus, even when the webbing worn by the passenger becomes slack, the slack is removed by a take-up force corresponding to the biasing force of the biasing member. Moreover, because the biasing force of the biasing member corresponds to non-tightness of the passenger wearing the webbing, the passenger wearing the webbing is not caused to experience a sense of tightness.

Further, because the take-up shaft is rotated in the webbing take-up direction by the drive force of the motor as described above when the passenger lifts the worn state of the webbing, the webbing can be excellently taken up on the take-up shaft and stored.

As described above, the motor retractor pertaining to the present invention can ensure an appropriate storing speed of a webbing and can stop a motor in a low torque state in abnormal times.

BRIEF DESCRIPTION OF THE DRAWINGS

An embodiment of the present invention will be described in detail based on the following figures, wherein.

DETAILED DESCRIPTION OF THE INVENTION

Figure 1:
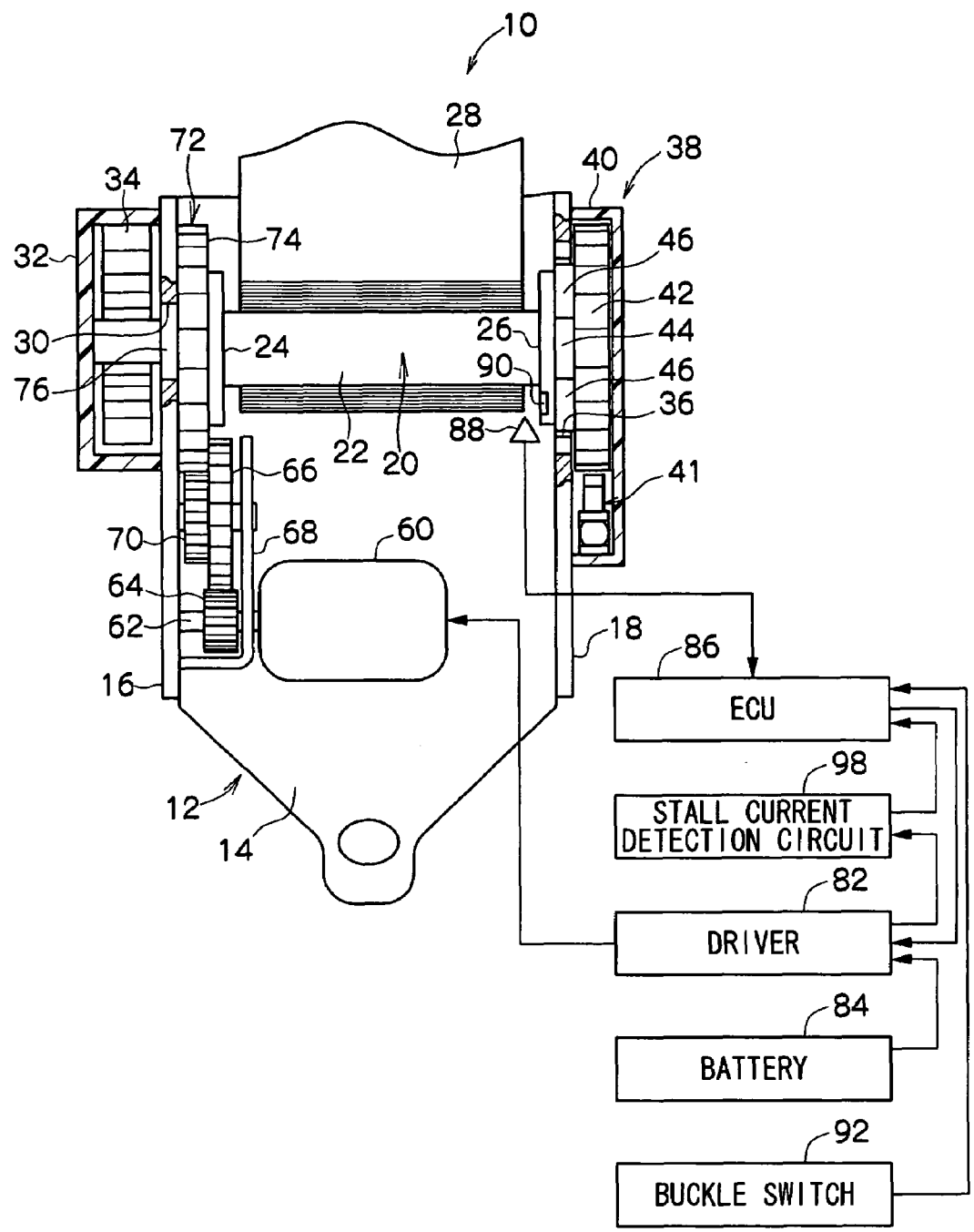
FIG. 1 is a front sectional view showing the overall configuration of a motor retractor pertaining to the embodiment of the invention.

FIG. 1 is a front sectional view showing the overall configuration of a motor retractor 10 pertaining to an embodiment of the invention.

As shown in FIG. 1, the motor retractor 10 is disposed with a frame 12. The frame 12 is disposed with a substantially plate-like back plate 14. The back plate 14 is fixed to a vehicle body by unillustrated fastening means such as a bolt, whereby the motor retractor 10 is attached to the vehicle body. Two leg plates 16 and 18 extend parallel to each other from both width-direction ends of the back plate 14. A spool 20 serving as a take-up manufactured by die casting or the like is rotatably disposed between these leg plates 16 and 18.

The spool 20 is configured by a substantially cylindrical spool body 22 and a pair of flange portions 24 and 26 that are formed in substantially discoid shapes on both end portions of the spool body 20, so that overall the spool 20 has a drum-like shape.

The base end portion of a webbing 28 formed in a long band-like shape is coupled and fixed to the spool body 22. When the spool 20 is rotated in one direction about its axis (below, this direction will be called "the take-up direction"), the webbing 28 is taken up from its base end side in layers on the outer peripheral portion of the spool body 22. When the webbing 28 is pulled out from its leading end side, the spool 20 rotates in accompaniment therewith and the webbing 28 is pulled out (below, the rotational direction of the spool 20 when the webbing 28 is pulled out will be called "the pullout direction").

One end side of the spool 20 at the flange portion 24 side opposite from the flange portion 26 substantially coaxially penetrates a circular hole 30 formed in the leg plate 16 and protrudes outward of the frame 12. A case 32 is disposed on the outer side of the frame 12 at the leg plate 16 side. The case 32 is disposed facing the leg plate 16 along the axial direction of the spool 20 and is fixed to the leg plate 16. Further, the case 32 overall opens toward the leg plate 16 side. The one end side of the spool 20 penetrating the circular hole 30 enters the inside of the case 32 and is rotatably supported by the case 32.

Moreover, a spiral spring 34 is disposed inside the case 32. The end portion of the spiral spring 34 at the outer side in the spiral direction is locked to the case 32, and the end portion of the spiral spring 34 at the inner side in the spiral direction is locked to the spool 20. The spiral spring 34 biases the spool 20 in the take-up direction.

The (take-up force of the webbing 28 based on the) biasing force of the spiral spring 34 is set to be relatively weak to the extent that it eliminates slack in the webbing 28 worn by a passenger. In other words, the biasing force of the spiral spring 34 is set such that it has a strength corresponding to passenger non-tightness in a worn state of the webbing 28. A force that completely takes up the webbing 28 pulled out from the spool 20 counter to frictional force or the like is not required.

The spool 20 is disposed with an unillustrated spindle portion that protrudes coaxially from the end portion at the flange portion 26 side. The spindle portion substantially coaxially penetrates an inner-tooth ratchet hole 36 formed in the leg plate 18, protrudes toward the outer portion of the frame 12, is fixed in a state where its open end abuts against the outer surface of the leg plate 18, and is rotatably supported by a substantially cup-like case 40 that configures a lock mechanism 38.

The lock mechanism 38 ordinarily allows the free rotation of the spool 20 in the take-up direction and in the pullout direction, and deters the rotation of the spool 20 in the pullout direction when the vehicle suddenly decelerates. In the present embodiment, the lock mechanism 38 is configured such that when an acceleration sensor 41 deters the rotation of a ratchet gear 42 in the pullout direction, a lock plate 46 protrudes from a lock base 44 and meshes with the inner teeth of the ratchet hole 36 in the leg plate 18 as a result of the relative rotation of the ratchet gear 42 and the spool 20, whereby the rotation of the spool 20 in the pullout direction is deterred. It will be noted that the lock mechanism 38 may also be configured to perform energy absorption (fulfill a force limiter function) by coupling a torsion bar between the lock base 44 and the spool 20 and twisting the torsion bar after the lock to allow the rotation of the spool 20 in the pullout direction.

A motor 60 is disposed between the leg plate 16 and the leg plate 18 under the spool 20. A gear 64 is coaxially and integrally disposed on an output shaft 62 of the motor 60.

A gear 66 whose diameter is larger than that of the gear 64 is disposed above the gear 64 in its radial direction. The gear 66 meshes with the gear 64 in a state where the gear 66 is supported by the leg plate 16 and a support plate 68 disposed between the leg plates 16 and 18 such that the gear 66 can freely rotate about an axis parallel to the spool 20. A gear 70 whose diameter is smaller than that of the gear 66 is coaxially and integrally disposed with respect to the gear 66 at the side of the gear 66 in its axial direction.

Moreover, a clutch 72 is disposed above the gear 70 in its radial direction. The clutch 72 is disposed with an outer-tooth gear 74 formed in a ring shape. The gear 74 is disposed coaxially and relatively rotatable with respect to the spool 20 in a state where the gear 74 meshes with the gear 70, and both axial-direction ends of the gear 74 are closed off by an unillustrated discoid member. Further, a cylindrical adapter 76 is disposed coaxially with respect to the spool 20 at the inner side of the gear 74. The adapter 76 is integrally coupled to the spool 20 and rotatably supports the discoid member—and therefore the gear 74—around the spool 20 in a state where the adapter 76 penetrates the discoid member that closes off both ends of the gear 74.

An unillustrated coupling member such as a pawl that oscillates by centrifugal force, for example, is housed inside the gear 74. The coupling member is supported by the discoid member and is configured to rotate integrally with the gear 74, for example.

Here, the clutch 72 is configured such that the rotational force of the output shaft 62 of the motor 60 is transmitted to the gear 74 via the gear 64, the gear 66 and the gear 70 (i.e., the output shaft 62 and the gear 74 always rotate synchronously), and when the output shaft 62 of the motor 60 rotates in the normal direction (normal rotation), the gear 74 rotates in the take-up direction. When the gear 74 rotates in the take-up direction, the coupling member becomes mechanically coupled to the outer peripheral surface of the adapter 76 and integrally couples together the gear 74 and the adapter 76. Thus, the rotation of the gear 74 in the take-up direction (the normal rotation of the motor 60) is transmitted to the spool 20 via the adapter 76.

On the other hand, when the output shaft 62 of the motor 60 rotates in the opposite direction (reverse rotation), the gear 74 rotates in the pullout direction. In this case, when the gear 74 relatively rotates a predetermined amount in the pullout direction with respect to the adapter 76 (i.e., when the output shaft 62 relatively rotates a predetermined amount with respect to the spool 20 by the reverse rotation of the motor 60), the mechanical coupling of the coupling member with respect to the adapter 76 is lifted and the clutch 72 is released.

The motor retractor 10 is also disposed with a driver 82 and an ECU 86 that configure a controller. A drive control program, which applies a drive control method of the motor retractor pertaining to the embodiment of the present invention, is stored in the ECU 86. Further, the motor 60 is electrically connected via the driver 82 to a battery 84 installed in the vehicle. Current from the battery 84 flows to the motor 60 via the driver 82, whereby the motor 60 normally rotates or reversely rotates the output shaft 62 by drive force. The driver 82 is connected to the ECU 86, and the electrical feed to the motor 60 via the driver 82, and the direction and size of the supply current, are controlled by the ECU 86.

Further, a spool rotation detection sensor 88 (in the present embodiment, a magnetic sensor) that configures the controller is connected to the ECU 86. The spool rotation detection sensor 88 corresponds to a magnet 90 disposed on the outer peripheral surface of the flange portion 26, and when the magnet 90 repeatedly passes the vicinity of the spool rotation detection sensor 88 by the rotation of the flange portion 26 (the spool 20), the spool rotation detection sensor 88 detects the magnetism created by the magnet 90 and outputs a predetermined electric signal (below, this signal will be called "the detection signal") to the ECU 86.

In this case, the ECU 86 detects the number of rotations of the spool 20 on the basis of the detection signal outputted from the spool rotation detection sensor 88 and detects the take-up amount of the webbing 28 from the detected number of rotations. On the basis of the take-up amount of the webbing 28, a control signal for controlling the driving of the motor 60 is outputted to the driver 82 from the ECU 86, and the driver 82 is actuated and the driving of the motor 60 is controlled on the basis of this control signal.

Moreover, a buckle switch 92 serving as the controller that detects whether or not a tongue plate (not shown) disposed on the webbing 28 is coupled to a buckle device (not shown) is connected to the ECU 86. When the tongue plate is coupled to the buckle device, the buckle switch 92 outputs an H-level signal representing the ON status of the switch to the ECU 86, and when the tongue plate is uncoupled from the buckle device, the buckle switch 92 outputs an L-level signal representing the OFF status of the switch to the ECU 86. The ECU 86 determines that the webbing 28 is in storage when the signal outputted from the buckle switch 92 is an L-level signal.

Further, a stall current detection circuit 98 that configures the controller is connected to the ECU 86. The stall current detection circuit 98 is connected to the motor 60 via the driver 82, and when the output shaft 62 of the motor 60 is locked (the rotation of the output shaft 62 is regulated) and stall current equal to or greater than a predetermined current value IL flows to the motor 60 (the driver 82), the stall current detection circuit 98 outputs a predetermined electric signal (below, this signal will be called "the lock detection signal") to the ECU 86.

Here, in the motor retractor 10, the ECU 86 and the driver 82 are configured to supply current of a predetermined current value I0 to the motor 60 to cause the motor 60 to normally rotate at the point in time when it is detected that the tongue plate disposed on the webbing 28 is uncoupled from the buckle device (when the webbing 28 is removed from the passenger when the passenger exits the vehicle). In this case, the size of the current value I0 is set on the basis of an appropriate storing speed (take-up speed) of the webbing 28, and is set larger than the current value IL of the stall current set in the stall current detection circuit 98 (I0>IL).

The ECU 86 and the driver 82 are also configured to reduce the size of the supply current to the motor 60 to a current value I1, which is smaller than the current value I0, at the point in time when a predetermined amount of the webbing 28 is taken up or at the point in time when a predetermined amount of time has elapsed after the electrical feed to the motor 60 is started (in the present embodiment, the point in time when the webbing has been taken up to the extent that it does not hinder the exiting of the vehicle by the passenger). In this case, the size of the current value I1 is set smaller than the current value IL of the stall current set in the stall current detection circuit 98 (I0>IL>I1).

Moreover, in the motor retractor 10, when external force counter to the taking-up of the webbing 28 acts after the ECU 86 and the driver 82 have reduced the size of the supply current to the motor 60 as described above (e.g., when a foreign object becomes entangled between the webbing 28 and an in-vehicle part such as a seat, or when the passenger pulls out the webbing 28 in order to again wear the webbing 28, or when the webbing 28 is completely stored), the output shaft 62 of the motor 60 is locked, whereby the stall current flows to the motor 60. When the size of the stall current becomes equal to or greater than the current value IL set in the stall current detection circuit 98, the stall current detection circuit 98 outputs the lock detection signal to the ECU 86. In this case, the ECU 86 and the driver 82 cut off the supply of current to the motor 60.

Figure 2:
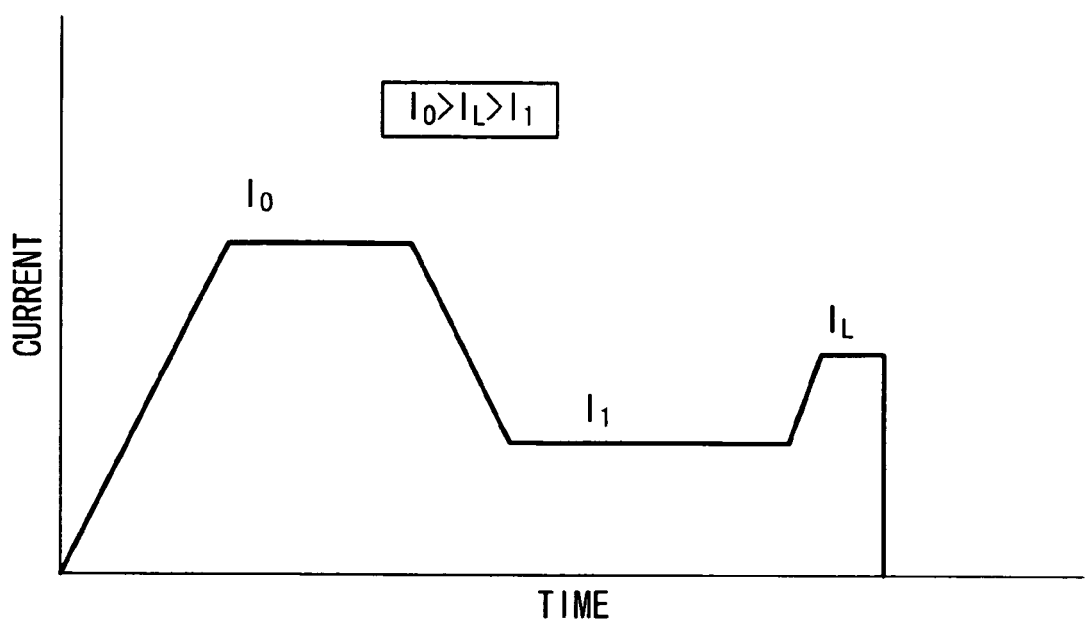
FIG. 2 is a line diagram showing the relationship between time and supply current to a motor when the motor retractor pertaining to the embodiment of the invention stores a webbing.

That is, in the motor retractor 10 pertaining to the present embodiment, the relationship between time and the current supplied to the motor 60 when the webbing 28 is to be stored is as shown in the line diagram of FIG. 2.

Figure 3:
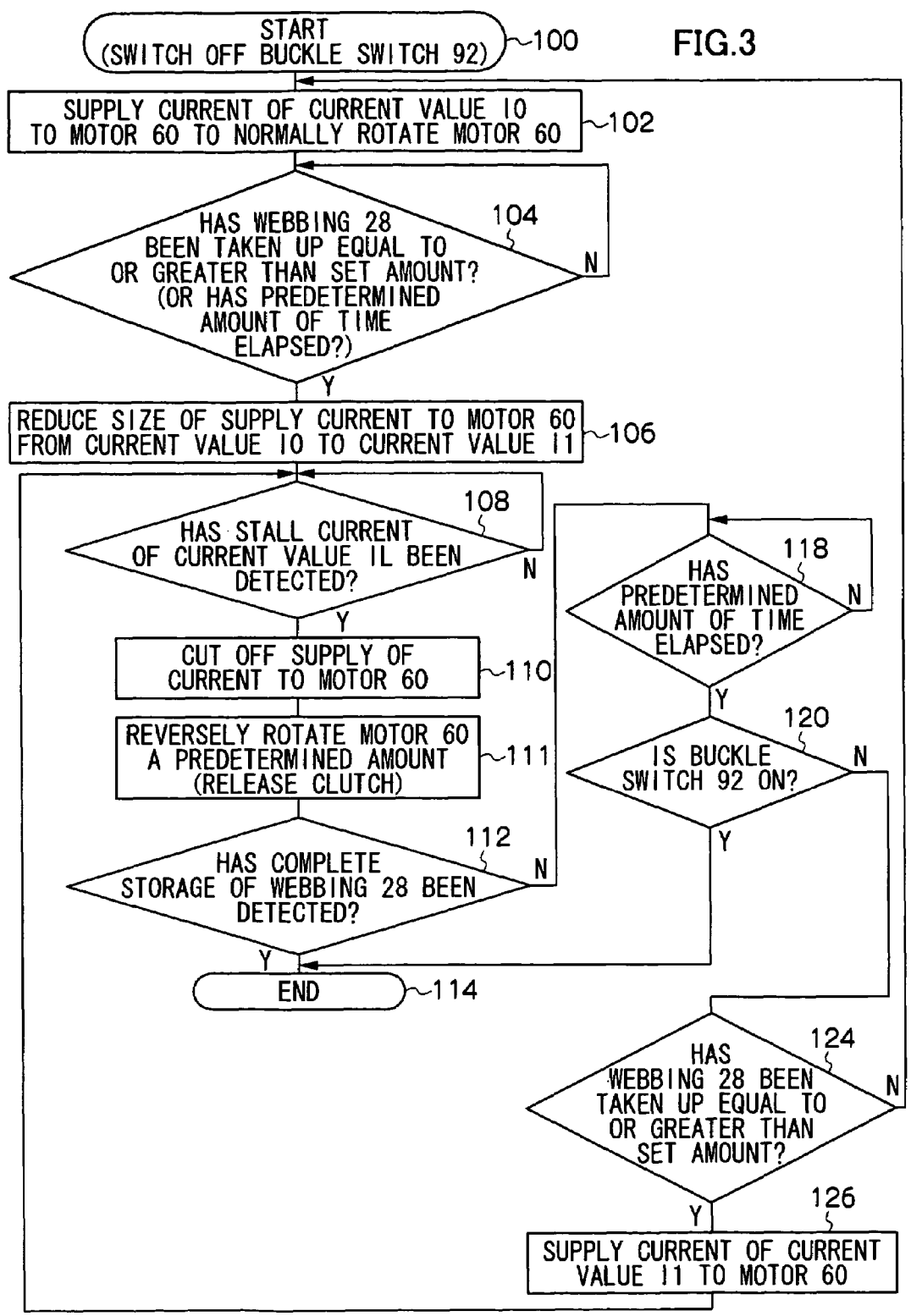
FIG. 3 is a flowchart showing the control process of a controller of the motor retractor pertaining to the embodiment of the invention.

Next, the action of the present embodiment will be described in accordance with the flowchart of the drive control program shown in FIG. 3.

When the tongue plate disposed on the webbing 28 is uncoupled from the buckle device and the buckle switch 92 is switched OFF (step 100), the ECU 86 determines that the webbing 28 has been removed from the body of the passenger when the passenger exits the vehicle, and the drive control program moves to step 102.

In step 102, the ECU 86 and the driver 82 supply current of the current value I0 to the motor 60 to cause the motor 60 to normally rotate. The normal rotation of the motor 60 is transmitted to the gear 74 of the clutch 72 via the gear 64, the gear 66 and the gear 70, and the gear 74 is rotated in the take-up direction. Thus, the clutch 72 becomes coupled, the drive force of the motor 60 is transmitted to the spool 20 via the clutch 72, and the spool 20 is rotated in the take-up direction. For this reason, the webbing 28 is forcibly taken up on the spool 20 at an appropriate storing speed corresponding to the current value I0. When the taking-up of the webbing 28 is started, the drive control program moves to step 104.

In step 104, the ECU 86 determines whether or not the number of rotations of the spool 20 has become equal to or greater than a predetermined number of rotations corresponding to the preset take-up amount of the webbing 28 (take-up amount to the extent that the webbing 28 does not hinder the exiting of the vehicle by the passenger) on the basis of the detection signal from the spool rotation detection sensor 88. Here, the ECU 86 detects the take-up amount of the webbing 28 on the basis of the detected number of rotations of the spool 20 and determines whether or not the take-up amount of the webbing 28 is equal to or greater than the preset take-up amount. The drive control program moves to step 106 only when this determination is YES. It will be noted that it is also possible for the ECU 86 to determine whether or not the take-up amount of the webbing 28 is equal to or greater than the preset take-up amount on the basis of the amount of time that has elapsed after the electrical feed to the motor 60 is started.

In step 106, the ECU 86 and the driver 82 reduce the size of the supply current to the motor 60 from the current value I0 to the current value I1. For this reason, the rotational speed of the motor 60 becomes slower and the take-up speed of the webbing 28 also becomes slower, but in this state, this does not become a problem because the webbing 28 is taken up to the extent that it does not hinder the exiting of the vehicle by the passenger. When the processing in step 106 ends, the drive control program moves to step 108.

In step 108, the ECU 86 determines whether or not the lock detection signal has been outputted from the stall current detection circuit 98. That is, when external force counter to the taking-up of the webbing 28 acts (e.g., when a foreign object becomes entangled between the webbing 28 and an in-vehicle part such as a seat, or when the passenger pulls out the webbing 28 in order to again wear the webbing 28, or when the webbing 28 is completely stored), the output shaft 62 of the motor 60 is locked and it is determined by ECU 86 whether or not stall current equal to or greater than the current value I1 is flowing to the motor 60. The drive control program moves to step 110 only when this determination is YES.

In step 110, the ECU 86 and the driver 82 cut off the supply of current to the motor 60 because stall current equal to or greater than the current value IL is flowing to the motor 60. Thus, the motor 60 stops and the taking-up of the webbing 28 at the time the webbing 28 is stored ends. In step 110, the motor 60 remains coupled to the spool 20 via the clutch 72. When the processing of step 110 ends, the drive control program moves to step 111.

In step 111, the ECU 86 and the driver 82 cause the motor 60 to reversely rotate a predetermined amount and release the clutch 72. Thus, it becomes possible for the spool 20 to freely rotate and for the webbing 28 to be pulled out. When the processing of step 111 ends, the drive control program moves to step 112.

In step 112, the ECU 86 determines, on the basis of the detection signal from the spool rotation detection sensor 88, whether or not the number of rotations of the spool 20 has become equal to the number of rotations preset in correspondence to the take-up amount when the webbing 28 is completely stored. Here, the ECU 86 detects the take-up amount of the webbing 28 on the basis of the detected number of rotations of the spool 20 and determines whether or not the take-up amount of the webbing 28 is equal to the take-up amount when the webbing 28 is completely stored.

When the determination in step 112 is YES, then it is determined that the take-up amount of the webbing 28 has reached the take-up amount when the webbing 28 is completely stored, and in step 114, the drive control program ends. On the other hand, when the determination in step 112 is NO, then it is determined that the take-up amount of the webbing 28 has not reached the take-up amount when the webbing 28 is completely stored, and the drive control program moves to step 118.

In step 118, the ECU 86 determines whether or not a predetermined amount of time has elapsed after it has become possible for the webbing 28 to be pulled out. That is, for example, the ECU 86 determines whether or not an amount of time necessary for the passenger to remove a foreign object that has become entangled between the webbing 28 and an in-vehicle part has elapsed, or whether an amount of time necessary for a passenger who has tried to again wear the webbing 28 to again wear the webbing 28 has elapsed. The drive control program moves to step 120 only when this determination is YES.

In step 120, the ECU 86 determines whether or not the tongue plate disposed on the webbing 28 has become coupled to the buckle device and the buckle switch 92 has been switched ON. That is, in step 120, it is determined whether or not the passenger is again wearing the webbing 28.

When the determination in step 120 is YES, then the drive control program moves to step 114 and ends. On the other hand, when the determination in step 122 is NO, then the drive control program moves to step 124.

In step 124, similar to step 104, the ECU 86 determines whether or not the take-up amount of the webbing 28 is equal to or greater than the preset take-up amount on the basis of the detection signal from the spool rotation detection sensor 88.

When the determination in step 124 is NO, then the drive control program returns to step 102 and repeats the aforementioned processing. On the other hand, when the determination in step 124 is YES, then the drive control program moves to step 126.

In step 126, the ECU 86 and the driver 82 supply current of the current value I1 to the motor 60 to cause the motor 60 to normally rotate. Thus, similar to step 102, the clutch 72 becomes coupled, the drive force of the motor 60 is transmitted to the spool 20 via the clutch 72, and the spool 20 is rotated in the take-up direction. For this reason, the webbing 28 is forcibly taken up on the spool 20 at a low speed corresponding to the current value I1. When the taking-up of the webbing 28 is started, then the drive control program returns to step 108 and repeats the aforementioned processing.

Here, in the motor retractor 10 pertaining to the embodiment of the present invention, as described above, current of the current value I0 is supplied to the motor 60 and the taking-up of the webbing 28 is started when the worn state of the webbing 28 is lifted (step 100). Because the current value I0 at this time is set in correspondence to an appropriate storing speed of the webbing 28, the webbing 28 can be suitably taken up in the period of time at the start of the taking-up of the webbing 28 (in a state where the webbing 28 has been sufficiently pulled out from the spool 20). Further, in this state, because the webbing 28 is being sufficiently pulled out from the spool 20, foreign objects do not become entangled between the webbing 28 and an in-vehicle part such as a seat, and there is sufficient leeway to remove foreign objects.

As described above, when it is detected in step 104 that an amount of the webbing 28 equal to or greater than a preset amount has been taken up, the size of the supply current is reduced in step 106 to the current value I1 that is smaller than the current value I0. For this reason, the take-up speed of the webbing 28 becomes slower, but this does not become a problem because the webbing 28 is taken up to the extent that it does not hinder the exiting of the vehicle by the passenger. Further, in this state, even if a foreign object does become entangled between the webbing 28 and an in-vehicle part, stall current of the current value IL that is larger than the current value I1 of the current supplied to the motor 60 flows to the motor 60, and the supply of current to the motor 60 is cut off in step 110.

In this manner, because the size of the supply current to the motor 60 is reduced from the initial current value I0 to the current value I1 at the point in time when the webbing 28 has been taken up to the extent that it does not hinder the exiting of the vehicle by the passenger, it can be set smaller than the current value IL of the stall current for stopping the motor 60 in correspondence to the current value I1. Thus, even when a foreign object becomes entangled between the webbing 28 and an in-vehicle part, it becomes possible to stop the motor 60 in a low torque state.

Moreover, in the motor retractor 10 pertaining to the embodiment of the present invention, because the take-up speed of the webbing 28 becomes slower in step 106 as described above, the tongue plate disposed on the webbing 28 unnecessarily colliding with inner parts inside the cabin when the webbing 28 is to be completely stored can be prevented or controlled. Thus, damage to inner parts inside the cabin can be prevented or controlled.

As described above, in the motor retractor 10 pertaining to the embodiment of the present embodiment, an appropriate storing speed of the webbing 28 can be ensured and the motor 60 can be stopped in a low torque state in abnormal times.

In the motor retractor 10 pertaining to the preceding embodiment, the threshold value IL of the stall current is set smaller than the current value I0 of the current initially supplied to the motor 60, but the invention is not limited to this. The threshold value IL may also be set equal to the current value I0 or slightly larger than the current value I0. In this case also, the motor 60 can be stopped in a low torque state in comparison to a conventional motor retractor.

What is claimed is:

1. A motor retractor comprising:
   a long band of webbing that restrains a body of a passenger seated in a seat of a vehicle in a state where the passenger is wearing the webbing;
   a take-up shaft to which a longitudinal-direction base end side of the webbing is locked and which is rotated such that the webbing can be taken up and pulled out;
   a motor that causes the take-up shaft to rotate in a webbing take-up direction; and
   a controller that controls a take-up force applied to substantially all of the webbing by supplying current of a first predetermined current value (I0) to the motor immediately after the worn state of the webbing has been lifted and reducing the size of the supply current to a second predetermined current value (I1) that is smaller than the first predetermined current value (I0) at a point in time when a preset amount of the webbing has been taken up or at a point in time when a predetermined amount of time has elapsed after the wearing of the webbing has been lifted,
   wherein the controller includes a current detection circuit that detects a stall current flowing to the motor, and the controller cuts off the supply of the current to the motor when the current detection circuit detects that a stall current exceeding a third predetermined current value (IL), wherein the third predetermined current value (IL) is smaller than the first predetermined current value (I0) and larger than the second predetermined current value (I1), is flowing to the motor from the predetermined point in time on.

2. The motor retractor of claim 1, wherein the controller includes a spool rotation detection sensor that detects the rotation of the take-up shaft, and the controller detects the take-up amount of the webbing on the basis of the output of the spool rotation detection sensor.

3. The motor retractor of claim 1, wherein the controller includes a buckle switch that detects whether or not a tongue plate attached to the webbing is coupled to a buckle device, and the predetermined amount of time is elapsed time when measurement is started on the basis of the output of the buckle switch.

4. The motor retractor of claim 1, further comprising a biasing member that is coupled to the take-up shaft and biases the take-up shaft in the webbing take-up direction with a biasing force that does not cause the passenger wearing the webbing to experience a sense of tightness.

5. A motor retractor comprising:
   a long band of webbing that restrains a body of a passenger seated in a seat of a vehicle;
   a take-up shaft to which a longitudinal-direction base end side of the webbing is locked and which is rotated such that the webbing can be taken up and pulled out;
   a motor that causes the take-up shaft to rotate in a webbing take-up direction; and
   a controller that controls a take-up force applied to substantially all of the webbing by supplying current of a first predetermined current value (I0) to the motor immediately after the worn state of the webbing has been lifted and reducing the size of the supply current to a second predetermined current value (I1) that is smaller than the first predetermined current value (I0) at a predetermined point in time prior to the completion of the taking-up of the webbing on the take-up shaft,
   wherein the controller includes a current detection circuit that detects a stall current flowing to the motor, and the controller cuts off the supply of the current to the motor when the current detection circuit detects that a stall current exceeding a third predetermined current value (IL), wherein the third predetermined current value (IL) is smaller than the first predetermined current value (I0) and larger than the second predetermined current value (I1), is flowing to the motor from the predetermined point in time on.

6. The motor retractor of claim 5, wherein the predetermined point in time is a point in time when a preset amount of the webbing has been taken up.

7. The motor retractor of claim 6, wherein the controller includes a spool rotation detection sensor that detects the rotation of the take-up shaft, and the controller detects the take-up amount of the webbing on the basis of the output of the spool rotation detection sensor.

8. The motor retractor of claim 5, wherein the predetermined point in time is a point in time when a predetermined amount of time has elapsed after the wearing of the webbing has been lifted.

9. The motor retractor of claim 8, wherein the controller includes a buckle switch that detects whether or not a tongue plate attached to the webbing is coupled to a buckle device, and the predetermined amount of time is elapsed time when measurement is started on the basis of the output of the buckle switch.

10. A motor retractor comprising:
a long band of webbing that restrains a body of a passenger seated in a seat of a vehicle in a state where the passenger is wearing the webbing;
a take-up shaft to which a longitudinal-direction base end side of the webbing is locked and which is rotated such that the webbing can be taken up and pulled out;
a motor that causes the take-up shaft to rotate in a webbing take-up direction; and
a controller that controls a take-up force applied to substantially all of the webbing by supplying current of a first predetermined current value (I0) to the motor immediately after the worn state of the webbing has been lifted, reducing the size of the supply current to a second predetermined current value (I1) that is smaller than the first predetermined current value (I0) at a point in time when a preset amount of the webbing has been taken up or at a point in time when a predetermined amount of time has elapsed, and thereafter cuts off the supply of the current to the motor when a stall current greater than the second predetermined current value (I1) flows to the motor,
wherein the second predetermined current value (I1) is greater than 0, and the motor continues the rotation of the take-up shaft in the webbing take-up direction by supplying current of the second predetermined current value (I1).

11. The motor retractor of claim 10, wherein the controller includes a spool rotation detection sensor that detects the rotation of the take-up shaft, and the controller detects the take-up amount of the webbing on the basis of the output of the spool rotation detection sensor.

12. The motor retractor of claim 10, wherein the controller includes a buckle switch that detects whether or not a tongue plate attached to the webbing is coupled to a buckle device, and the predetermined amount of time is elapsed time when measurement is started on the basis of the output of the buckle switch.

13. The motor retractor of claim 10, further comprising a biasing member that is coupled to the take-up shaft and biases the take-up shaft in the webbing take-up direction with a biasing force that does not cause the passenger wearing the webbing to experience a sense of tightness.

14. A method of controlling a motor retractor that includes a long band of webbing that restrains a body of a passenger seated in a seat of a vehicle, a take-up shaft to which a longitudinal-direction base end side of the webbing is locked and which rotates such that the webbing can be taken up, and a motor that causes the take-up shaft to rotate in a webbing take-up direction, the method comprising:
supplying current of a first predetermined current value (I0) to the motor immediately after the wearing of the webbing has been lifted and rotating the take-up shaft in the take-up direction;
reducing the size of the supply current to a second predetermined current value (I1) that is smaller than the first predetermined current value (I0) at a predetermined point in time prior to the completion of the taking-up of the webbing on the take-up shaft, and
cutting off the supply of the current to the motor when a stall current exceeding a third predetermined current value (IL) that is smaller than the first predetermined current value (I0) and larger than the second predetermined current value (I1) is flowing to the motor from the predetermined point in time on,
wherein a take-up force applied to substantially all of the webbing is controlled by the amount of current supplied to the motor, and the predetermined point in time is a point in time when a preset amount of the webbing has been taken up.

15. The motor retractor control method of claim 14, wherein the predetermined point in time is a point in time when a predetermined amount of time has elapsed after the wearing of the webbing has been lifted.

16. A motor retractor comprising:
a long band of webbing that restrains a body of a passenger seated in a seat of a vehicle in a state where the passenger is wearing the webbing;
a take-up shaft to which a longitudinal-direction base end side of the webbing is locked and which is rotated such that the webbing can be taken up and pulled out;
a motor that causes the take-up shaft to rotate in a webbing take-up direction; and
a controller that controls a take-up force applied to substantially all of the webbing by supplying current of a first predetermined current value (I0) to the motor immediately after the worn state of the webbing has been lifted and reducing the size of the supply current to a second predetermined current value (I1) that is smaller than the first predetermined current value (I0) at a point in time when a preset amount of the webbing has been taken up or at a point in time when a predetermined amount of time has elapsed after the wearing of the webbing has been lifted,
wherein the second predetermined value (I1) is greater than 0, and the motor continues the rotation of the take-up shaft in the webbing direction by supplying current of the second predetermined current value (I1).

17. A motor retractor comprising:
a long band of webbing that restrains a body of a passenger seated in a seat of a vehicle;
a take-up shaft to which a longitudinal-direction base end side of the webbing is locked and which is rotated such that the webbing can be taken up and pulled out;
a motor that causes the take-up shaft to rotate in a webbing take-up direction; and
a controller that controls a take-up force applied to substantially all of the webbing by supplying current of a first predetermined current value (I0) to the motor immediately after the worn state of the webbing has been lifted and reducing the size of the supply current to a second predetermined current value (I1) that is smaller than the predetermined current value (I0) at a predetermined point in time prior to the completion of the taking-up of the webbing on the take-up shaft,
wherein the second predetermined value (I1) is greater than 0, and the motor continues the rotation of the take-up shaft in the webbing direction by supplying current of the second predetermined current value (I1).

18. A method of controlling a motor retractor that includes a long band of webbing that restrains a body of a passenger seated in a seat of a vehicle, a take-up shaft to which a longitudinal-direction base end side of the webbing is locked and which rotates such that the webbing can be taken up, and a motor that causes the take-up shaft to rotate in a webbing take-up direction, the method comprising:

supplying current of a first predetermined current value ($I0$) to the motor immediately after the wearing of the webbing has been lifted and rotating the take-up shaft in the take-up direction;

reducing the size of the supply current to a second predetermined current value ($I1$) that is smaller than the first predetermined current value ($I0$) at a predetermined point in time prior to the completion of the taking-up of the webbing on the take-up shaft, wherein the second predetermined value ($I1$) is greater than 0, and the motor continues the rotation of the take-up shaft in the webbing direction by supplying current of the second predetermined current value ($I1$).

* * * * *